United States Patent [19]
Inoue

[11] Patent Number: 6,016,966
[45] Date of Patent: Jan. 25, 2000

[54] AIR CONDITIONING SYSTEM FOR AUTOMOTIVE VEHICLES

[75] Inventor: Atsuo Inoue, Sawa-gun, Japan

[73] Assignee: Sanden Corporation, Gunma, Japan

[21] Appl. No.: 08/917,610

[22] Filed: Aug. 26, 1997

[30] Foreign Application Priority Data

Aug. 26, 1996 [JP] Japan .................................. 8-244315

[51] Int. Cl.$^7$ ............................ F28F 27/00; G05D 15/00
[52] U.S. Cl. ........................... 236/37; 236/78 D; 364/165
[58] Field of Search .............................. 236/91 F, 78 D, 236/37; 364/165

[56] References Cited

U.S. PATENT DOCUMENTS

| | | | |
|---|---|---|---|
| 2,779,162 | 1/1957 | Baker et al. | 62/244 X |
| 3,074,249 | 1/1963 | Henderson | 62/149 |
| 3,564,865 | 2/1971 | Spencer et al. | 62/197 |
| 3,695,055 | 10/1972 | Bruce | 62/157 |
| 4,025,763 | 5/1977 | Kleiss | 318/610 X |
| 4,262,492 | 4/1981 | Morita et al. | 62/324.6 |
| 4,289,195 | 9/1981 | Bellot et al. | 236/91 F |
| 4,326,386 | 4/1982 | Tamura | 62/158 |
| 4,328,855 | 5/1982 | Iwata et al. | 236/84 X |
| 4,337,821 | 7/1982 | Saito | 237/123 A |
| 4,344,565 | 8/1982 | Kojima et al. | 236/46 R |
| 4,345,714 | 8/1982 | Kojima | 236/46 R |
| 4,471,632 | 9/1984 | Nishi et al. | 62/208 |
| 4,494,184 | 1/1985 | Crevel | 364/178 |
| 4,510,764 | 4/1985 | Suzuki | 62/133 |
| 4,537,245 | 8/1985 | Nishimura et al. | 62/244 X |
| 4,539,821 | 9/1985 | Tamura | 62/228.5 |
| 4,633,674 | 1/1987 | Sato | 62/117 X |
| 4,673,031 | 6/1987 | Wiemer | 236/78 D |
| 4,788,828 | 12/1988 | Sato | 62/214 |
| 4,796,438 | 1/1989 | Sato | 62/133 |
| 4,832,258 | 5/1989 | Hoshino et al. | 236/13 |
| 4,840,038 | 6/1989 | Sato | 62/210 |
| 4,986,082 | 1/1991 | Tomaru | 62/149 |
| 5,076,063 | 12/1991 | Kamegasawa et al. | 62/149 |
| 5,156,012 | 10/1992 | Kuribara et al. | 62/129 |
| 5,187,942 | 2/1993 | Komatsu et al. | 62/149 |
| 5,189,886 | 3/1993 | Terauchi | 62/228.5 |
| 5,226,595 | 7/1993 | Devera et al. | 62/228.3 |
| 5,315,841 | 5/1994 | Inoue | 62/225 |
| 5,341,651 | 8/1994 | Inoue | 237/2 B |
| 5,632,154 | 5/1997 | Sibik et al. | 364/165 X |
| 5,678,761 | 10/1997 | Ikeda | 237/2 B |
| 5,765,383 | 6/1998 | Inoue | 62/209 |

FOREIGN PATENT DOCUMENTS

| | | | |
|---|---|---|---|
| 58-043340 | 3/1983 | Japan . | |
| 0223761 | 9/1990 | Japan | 236/78 D |
| 5215394 | 8/1998 | Japan . | |

OTHER PUBLICATIONS

Norman Anderson, Instrumentation for process measurement and control Jan. 1974, pp. 161,162, TA165.A75 1972.
"Moderate thermal environments—Determination of the PMV and PPD indices and specification of the conditions for therman comfort", *International Standard*, Dec. 15, 1994, ISO 7730:1994(E).

*Primary Examiner*—William Wayner
*Attorney, Agent, or Firm*—Baker & Botts, L.L.P.

[57] ABSTRACT

In an air conditioning system for controlling the temperature of a vehicle passenger compartment, a valve is disposed in a fluid passageway for controlling an amount of the engine coolant flowing toward the heat exchanger. A sensor device senses an air temperature for the air flow through the heat exchanger and generates an electrical sensor signal indicative thereof. A temperature selector selects a target temperature of the air flow through the heat exchanger and generates an electrical set signal indicative thereof. A control circuit controls opening of the valve by integrating a feed-back control and a feed-forward control based on the electrical sensor signal and the electrical set signal. Therefore, the air conditioning system is adapted for improving control response characteristics without influences from disturbances and ensures improved control to provide stable control with rapid response to achieve a target temperature or a modification to the set temperature inside of the passenger compartment, or both.

14 Claims, 6 Drawing Sheets

AIR CONDITIONING SYSTEM FOR AUTOMOTIVE VEHICLES

BACKGROUND OF THE INVENTION

1. Field of the Invention

The present invention relates generally to air conditioning systems, and, more particularly, to an air distributing mechanism for air conditioning systems in automotive vehicles.

2. Description of the Related Art

Automotive air conditioning systems having a passenger compartment air temperature control device are known in the art. Generally, an automotive air conditioning system is provided with a heat exchanger which is fluidly connected to and driven by an engine, that radiates heat introduced to the heat exchanger by a flow of engine coolant. The automotive air conditioning system controls the heating of the passenger compartment. A coolant pump, which is also fluidly connected to the engine, circulates the coolant.

The temperature of the passenger compartment is controlled by either a manual control mechanism or by an automatic control mechanism which employs an algorithm to achieve a predetermined temperature. For example, U.S. Pat. No. 5,226,595 to Devera et al. (Unexamined Japanese Publication patent, No. H5-246230) are known.

Figure 1:
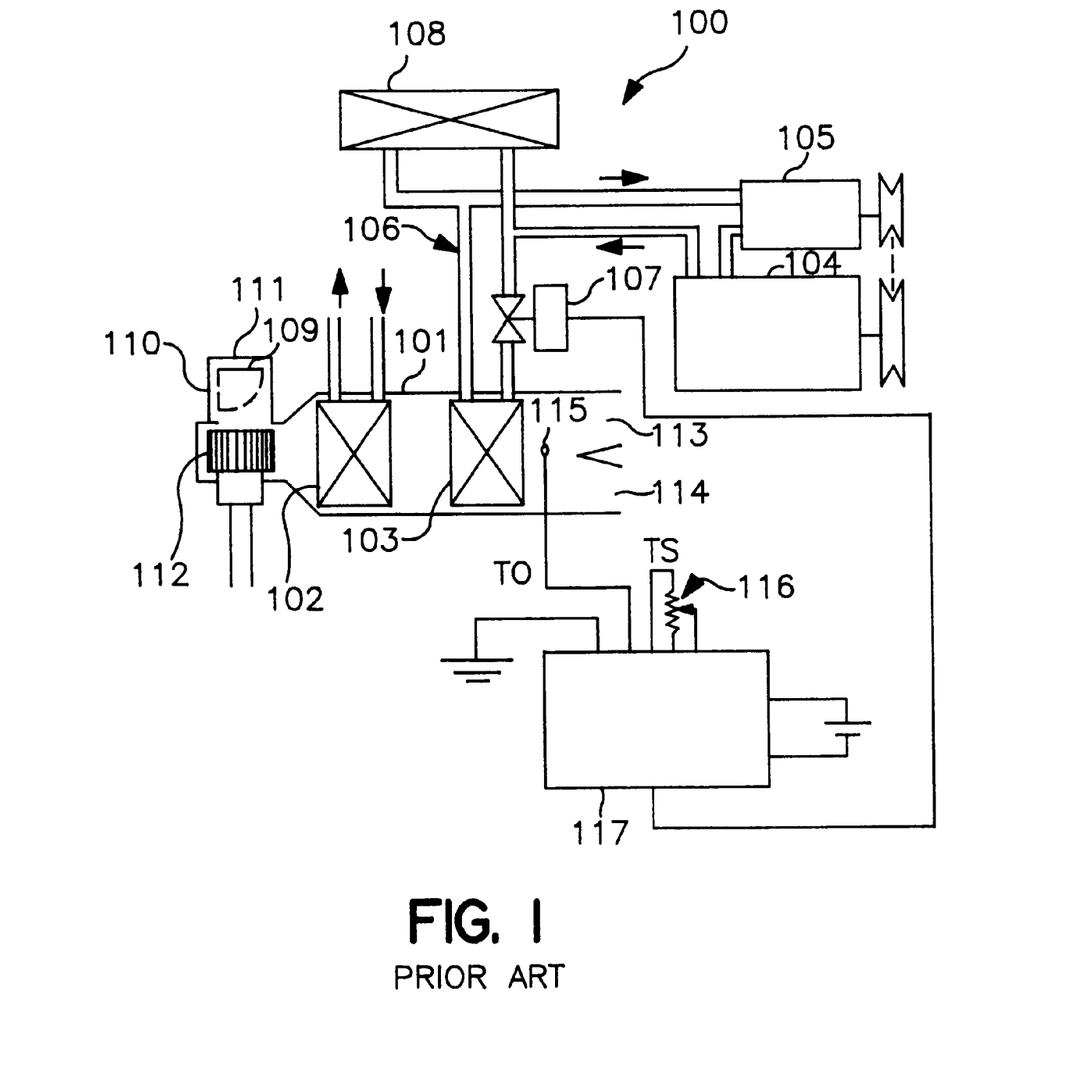
FIG. 1 is a schematic view of a known automotive air conditioning system.

FIG. 1 discloses an overall configuration of a known air conditioning system. An air conditioning system 100 includes duct unit 101 provided with a blower device 112; an inside air inlet opening 110, which communicates with the automobile compartment to exhaust recirculated air; and an outside air inlet opening 111, which communicates with an external space. These inlets are opened and closed by a damper 109. Air conditioning system 100 further includes evaporator 102, which is a part of a refrigerant circuit for cooling air passing therethrough; heater core 103 disposed downstream from evaporator 102; and a plurality of outlets (e.g., a defroster outlet 113 and a floor outlet 114), each of which opens into the automobile compartment.

Heater core 103 is fluidly connected to engine 104 and receives engine coolant from engine 104 through a coolant pump 105, vehicle radiator 108, and control valve mechanism 107, each of which is serially connected to engine 104 by a fluid passageway 106. Coolant pump 105 is driven by engine 104 via an engine driven member, such as a belt.

Further, an air temperature sensor 115 for detecting the temperature at the rear of heater core 103 is disposed downstream from heater core 103 and is electrically connected to an electric control unit 117 that controls the opening and closing of control valve 107. A temperature setting device 116 also is electrically connected to electrical control unit 117 to control a set temperature "TS."

In the operation of air conditioning system 100, coolant that is heated by engine 104 is pumped into heater core 103 by coolant pump 105 with control valve 107 regulating the amount of the flow of coolant therethrough. The coolant is cooled in radiator 108, as required, and is circulated within fluid passageway 106.

Air is drawn from inside and outside air inlet openings 110 and 111 by closing or opening damper 109, and flows into the automotive compartment from outlet openings 113 or 114 through evaporator 102 and through the coils of heater core 103. Typically, air circulation is forced by blower device 112.

Further, set temperature "TS" is determined according to temperature setting device 116 in a manual air conditioner. In an automatic air conditioning system, set temperature "TS" is determined in response to several factors, including temperature setting device 116, the temperature in the passenger compartment, the air temperature outside, and the quantity of solar radiation entering the vehicle.

The temperature of the air discharged to the passenger compartment is controlled by regulating the opening of control valve 107. Sensor 115 generates a sensor signal by detecting air temperature "TO" at outlet of heater core 103. Temperature setting device 116 generates a setting signal by determining set temperature "TS."

Figure 2:
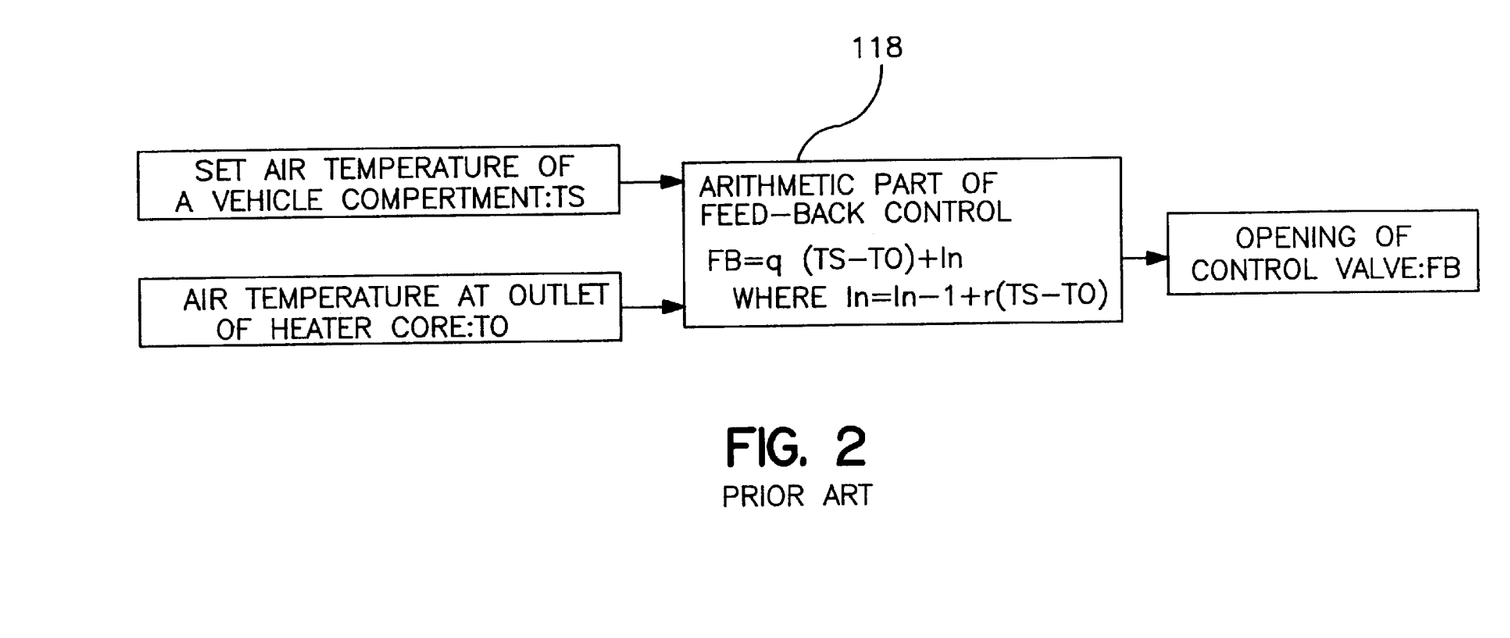
FIG. 2 is a block diagram of a electrical control unit of the automotive air conditioning system of FIG. 1.

Sensor and setting signals are input continuously into electric control unit 117. Using these signals, electric control unit 117 computes a value for opening "FB" at control valve 107 that is necessary to achieve the desired vehicle compartment temperature "TS" using the automatic feed-back algorithm shown in FIG. 2. The terms "q" and "r" in arithmetic feedback algorithm represent coefficients.

Several factors may alter the operation of the air conditioning system. For example, a change in the rotation speed of engine 104 alters the amount of coolant that flows to the heat exchanger; a change in rotation speed of blower device 112 alters the air quantity generated by blower device 112; the mixture of interior air with exterior air exhausted from interior and exterior air outlet openings 110 or 111 alters air temperature at an inlet of evaporator 102; and, the activation or de-activation of a compressor (not shown) fluidly connected to evaporator 102; and the change in air temperature outside the vehicle alters air temperature at the inlet of evaporator 102. Therefore, in these conditions, the disturbances discussed above may cause a change in the outlet air temperature "TO" of heater core 103 blown from outlet openings 113 or 114 because outlet air temperature "TO" is controlled by only feedback control (PI control or PID control). Accordingly, this results in an uncomfortable environment for a vehicle passenger whenever outlet air temperature "TO" of heater core 103 increases.

In addition, if coefficients "q" and "r" in the arithmetic feedback algorithm are regulated to prevent a change in outlet air temperature "TO," control valve 107 exhibits a "hunting" phenomena and becomes unstable.

Figure 3:
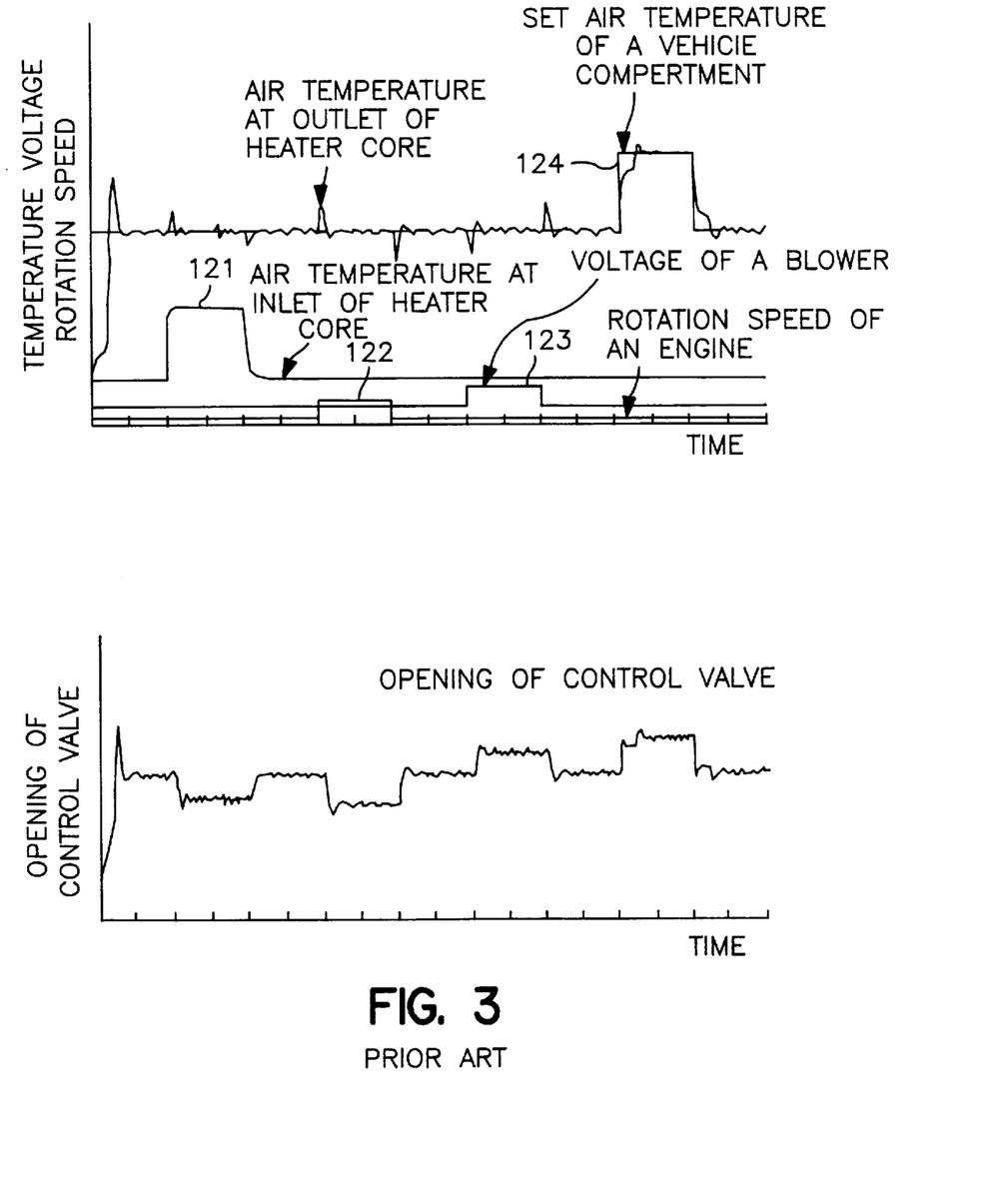
FIG. 3 is a graph illustrating the relationship of the valve opening, air temperature, blower voltage, and rotation speed of an engine, to time in the automotive air conditioning system of FIG. 1.

FIG. 3 illustrates the control characteristic curves of control valve 107. It shows that outlet air temperature "TO" of heater core 103 changes significantly in response to change 121 in inlet air temperature "TI," change 122 in rotation speed of engine 104, change 123 in voltage of blower 112, and change 124 in set temperature "TS." Further, the regulation of control valve 107 tends to be unstable, i.e., to overshoot the desired valve position or to exhibit a "hunting" condition. For instance, when the passenger in the vehicle changes set temperature "TS," it takes a significant period of time for the outlet air temperature "TO" to rise to meet set temperature "TS." It takes additional time for the air temperature in the passenger compartment to reach the set temperature "TS."

These and other problems in the related art are addressed by the invention described below.

SUMMARY OF THE INVENTION

It is an object of the invention to provide an automobile air conditioning system adapted for improving the response characteristics of control, and reducing or eliminating influence from outside disturbances.

It is another object of the invention to provide an automobile air conditioning system that achieves improved control by providing stable control with a rapid response to attain a target temperature or a modification to the temperature setting inside of an automobile compartment, or both.

According to the present invention, an air conditioning system for controlling the temperature of a vehicle passenger compartment includes a blower device which directs air flow toward the passenger compartment; a heat exchanger exchanges heat with the air flow that is generated by the blower device; and, a pump device which is driven by the engine for circulating engine coolant therethrough.

An air conditioning system includes a fluid passageway, which is serially connected to the engine, the pump, and the heat exchanger for passing the engine coolant therethrough; a valve, which is disposed in the fluid passageway for controlling the engine coolant flowing toward the heat exchanger; a sensor device, which is disposed adjacent the heat exchanger device for sensing an air temperature of the air flow through the heat exchanger and generates an electrical sensor signal indicative thereof; a temperature selecting device, which selects a target temperature for the air flow through the heat exchanger device and generates an electrical set signal indicative thereof; and, a control circuit, which controls an opening of the valve by integrating feed-back control and feed-forward control based on the electrical sensor signal and the electrical set signal.

Further objects, features, and advantages of this invention will be understood from the following detailed description of preferred embodiments of this invention with reference to the drawings.

DETAILED DESCRIPTION OF PREFERRED EMBODIMENTS

Figure 4:
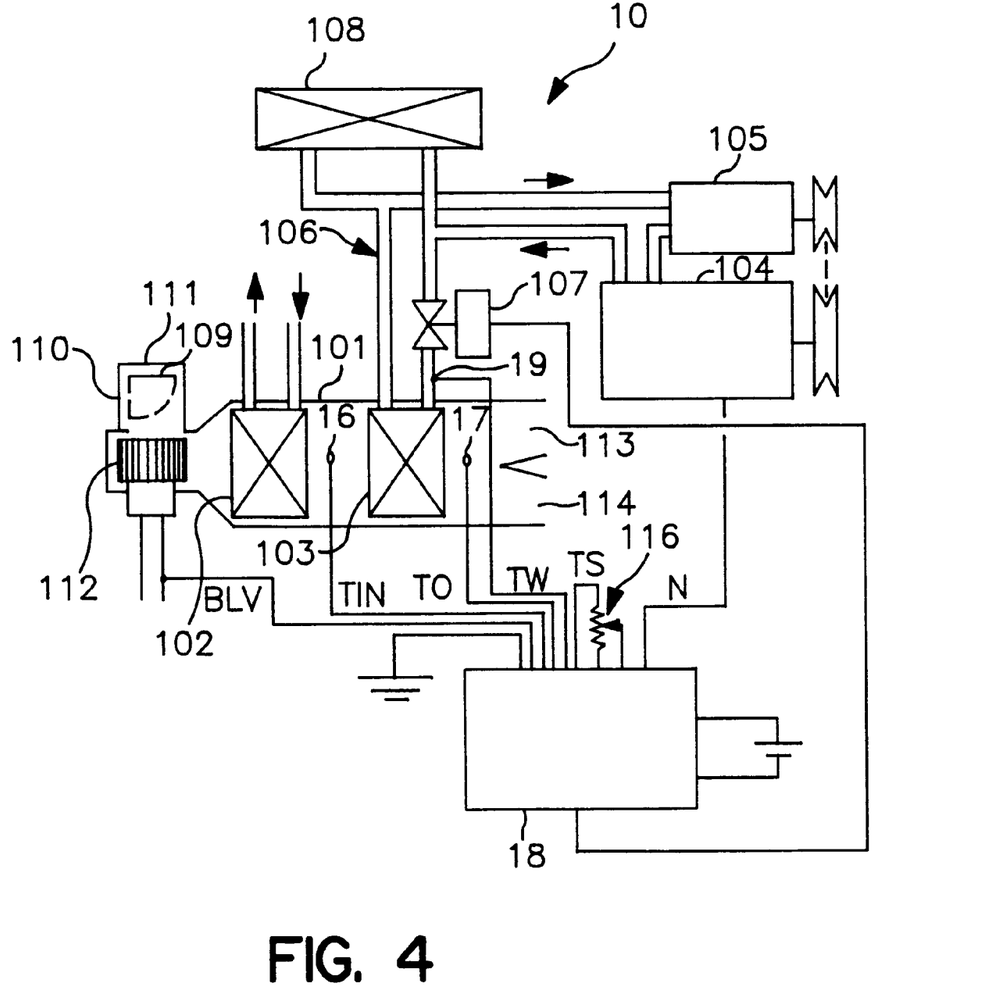
FIG. 4 is a schematic view of an automotive air conditioning system in accordance with an embodiment of the present invention.

FIG. 4 depicts an automotive air conditioning system in accordance with an embodiment of the present invention. In the drawings, like reference numerals are used to denote elements corresponding to those shown in FIG. 1.

An air conditioning system 10 includes a first sensor 16 for detecting air temperature "TIN" at an inlet of heater core 103, which is disposed in duct 101 upstream from heater core 103. A second sensor 17 for detecting air temperature "TO" at an outlet of heater core 103 is disposed in duct 101 downstream from heater core 103.

First and second sensors 16 and 17 provide electrical sensor signals according to an inlet air temperature "TIN" and an outlet air temperature "TO," respectively, to electrical control unit 18. Further, air conditioning system 10 includes a third sensor 19 for detecting the temperature "TW" of a fluid, such as a engine coolant (e.g., an aqueous solution of ethylene glycol) at a fluid inlet of heater core 103, and is disposed in fluid passageway 106 between control valve 107 and the inlet of heater core 103. Third sensor 19 also generates an electrical sensor signal according to fluid temperature "TW" to electric control unit 18.

Further, engine 104 and blower device 102 are electrically connected to electric control unit 18 and provide electrical signals according to the rotation speed "N" of engine 104 and the voltage "BLV" of blower device 112 to electrical control unit 18.

Figure 5:
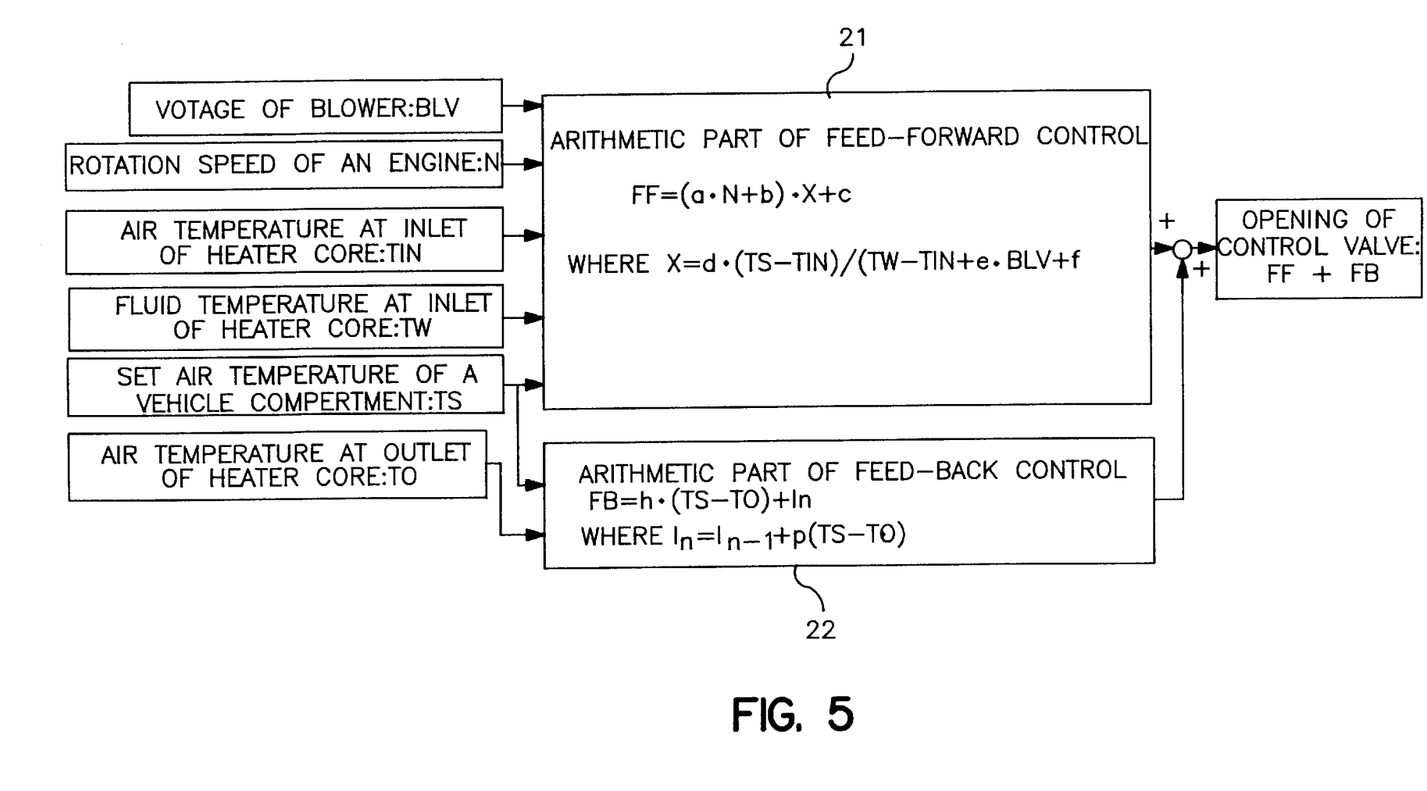
FIG. 5 is a block diagram of a electrical control unit of the automotive air conditioning system in accordance with the present invention.

Electric control unit 18 comprises a microprocessor which includes an arithmetic feed-forward algorithm 21 and an arithmetic feedback algorithm 22, as shown in FIG. 5.

Arithmetic feedback algorithm 22 determines the opening "FB" of control valve 107 by performing an arithmetic operation on the electrical signals set temperature "TS" and air outlet temperature "TO" of heater core 103. Feed-forward algorithm 21 calculates a desirable opening of control valve 107. Arithmetic feed-forward algorithm 21 calculates opening "FF" of control valve 107 by performing an arithmetic operation on the electrical signals set temperature "TS," air inlet temperature "TIN" of heater core 103, fluid temperature "TW" of heater core 103, rotation speed "N" of a vehicle engine, and blower voltage "BLV."

In arithmetic feed-forward algorithm 21, opening "FF" of valve control 107 is calculated based on the following equation:

$$FF=(a \cdot N+b) \cdot X+c$$

in which $X=d \cdot (TS-TIN)/(TW-TIN)K+e \cdot BLV+f$

In the foregoing feed-forward algorithm, "a," "b," "c," "d," "e," and "f" are coefficients that are determined by the design specifications for the automotive air conditioning system. The equation is an empirical formula introduced by the experience of the inventor.

Table 1 illustrates relationships between the coefficients and the design specifications of components of the air conditioning system.

TABLE 1

| Coefficients | Design specification |
| --- | --- |
| a, b, c | capacity of a pump (decreases "a," "b," c" due to increase in pump capacities) |
| a, b, c | driving ratio between an engine and a pump (decreases "a," "b," c" due to increase in driving ratio) |
| a, b, c | heat exchange efficiency of a heater core (decreases "a," "b," c" due to increase in efficiency) |
| a, b, c | capacity of a control valve (decreases "a," "b," c" due to increase in valve capacity) |
| d | heat exchange efficiency of a heater core (increases "d" due to increase in efficiency) |
| e, f | rating of a blower (decreases "e," "f" due to increase in rating) |

For example, in a sedan-type automotive vehicle, the coefficients may have the following values: a=−0.0015; b=0.15; c=3.0; d=70; e=6.0; and f=13. These coefficients may increase or decrease, as indicated in Table 1, due to changes in the design specifications of components of the air conditioning system. Moreover, the driving ratio between an engine and a pump is defined by the rotation speed of a pump per rotation speed of an engine. Further, the rating of a blower is defined by the blower air capacity per unit voltage.

In the foregoing arithmetic feed-forward algorithm, operation signals from set temperature "TS," air inlet temperature "TIN" of heater core 103, fluid temperature "TW" of heater core 103, rotation speed "N" of a vehicle engine, and blower voltage "BLV" need not be input in electric control unit 18 as variables, i.e., they may be omitted if it is not necessary to consider operating stability of control valve 107 against the disturbances caused by change in any of the above electrical signals.

In this case, constants shown in Table 2 may be substituted into the foregoing equation in lieu of variables described in the equation.

TABLE 2

| | |
|---|---|
| Blower voltage (BLV) | 7 V |
| Rotation speed of an engine (N) | 1500 rpm |
| Air temperature at inlet of a heater core (TIN) | 0° C. |
| Fluid temperature at inlet of a heater core (TW) | 90° C. |

In arithmetic feed-back algorithm 22, opening "FB" of control valve 107 is calculated according to the following equation:

$$FB = h \cdot (TS-TO) + I_n$$

in which $I_n = I_{n-1} + p \cdot (TS-TO)$, and $I_{n-1}$ represents a previous value of a calculated integration. Further, "h" and "p" are coefficients and are determined by the design specifications for the automotive air conditioning system. As is apparent from the equation above, arithmetic feed-back control, algorithm is the arithmetic PI or PID control algorithm, each of which is controlled by combining Proportion Calculus Action and Integration Calculus Action or by combining Proportion Calculus Action, Integration Calculus Action, and Differential Calculus Action.

Thus, set temperature "TS" is set according to temperature setting device 116, such as a potentiometer, in manual air conditioners. On the other hand, set temperature "TS" is set according to set value of temperature setting device 116, such as an electrical circuit, and is calculated based on information such as the air temperature in the vehicle compartment, the air temperature at outside of the vehicle, the quantity of solar radiation entering the vehicle through the windows, and the like, in the automatic air conditioner.

Accordingly, the desired opening "FV" of valve control 107 incorporated by feed forward control is represented by the followings equation:

$$FV = FB + FF$$

Therefore, control valve 107 is operated according to opening "FV" which is the sum of "FF" and "FB."

In the operation of air conditioning system 10, coolant that is heated by engine 104 is pumped into heater core 103 by coolant pump 105 with control valve 107 regulating the amount of the flow of coolant therethrough by using feed forward control "FV." The coolant is cooled in radiator 108 as required and is circulated within fluid passageway 106.

Air is drawn from inside or outside air inlet openings 110 and 111, respectively, by opening or closing damper 109, and flows into the passenger compartment from outlet openings 113 or 114 through evaporator 102 and heater core 103. Normally, air circulation is forced by blower device 112.

Figure 6:
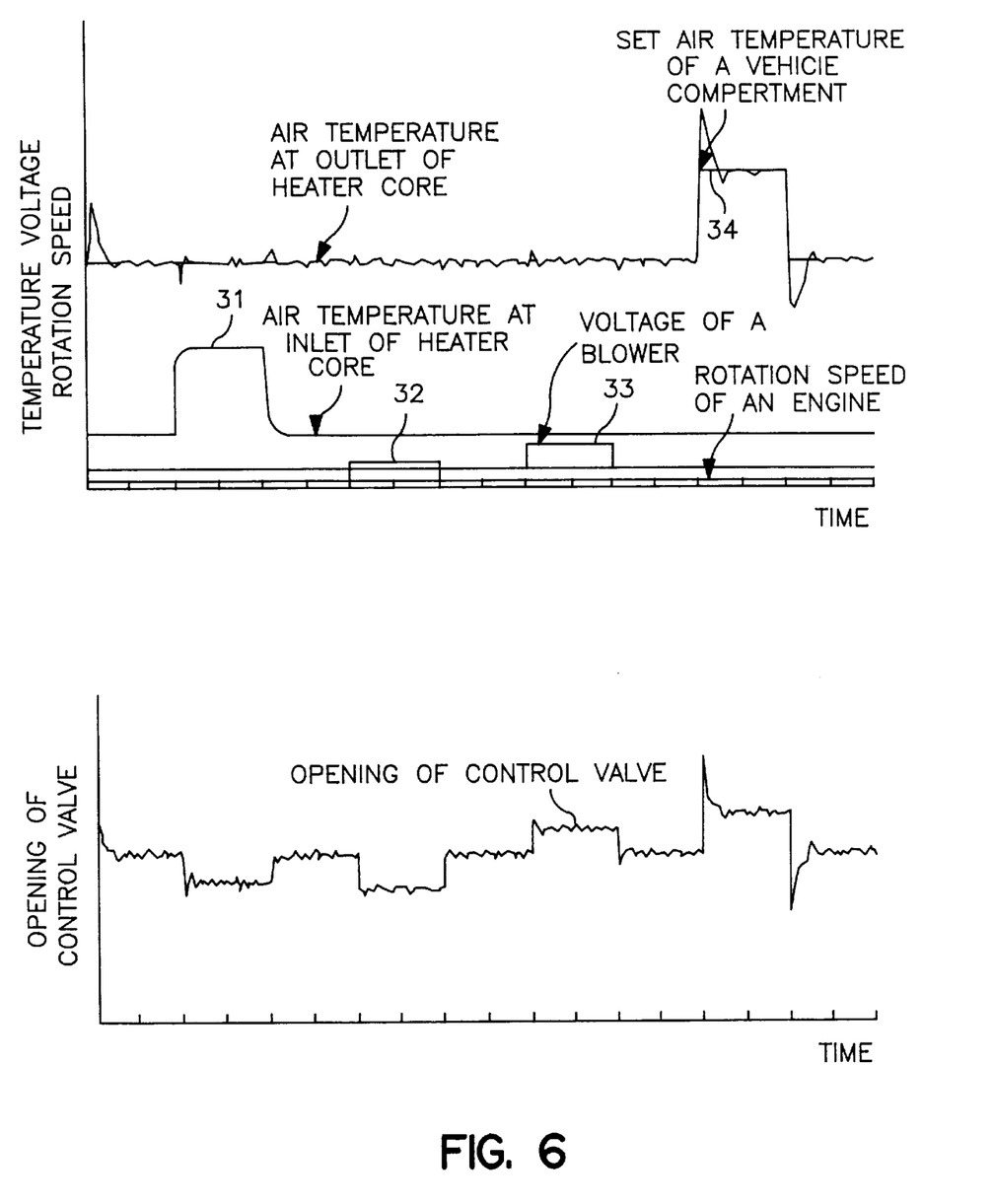
FIG. 6 is a graph illustrating the relationship between the valve opening, air temperature, blower voltage, and rotation speed of an engine, to time in the automotive air conditioning system of the present invention.

FIG. 6 illustrates control characteristic curves of an air conditioning system according to an embodiment of this invention obtained when (31) inlet air temperature "TIN" of heater core 103 is forcibly changed by shifting damper 110, (32) rotation speed "N" of engine 104 is changed, (33) voltage "BLV" of blower 112 is changed and (34) set temperature "TS" is changed. Outlet air temperature "TO" of heater core 103 does not change significantly and exhibits a stable condition despite these disturbances. Even if set temperature "TS" is changed, outlet air temperature "TO" of heater core 103 quickly achieves set temperature "TS." Therefore, the air conditioning system that has electrical control unit 18 has a superior responsiveness to changes in set temperature "TS." Further, outlet air temperature "TO" of heater core 103 exhibits a significant upturn, i.e., an overshooting locus, as shown in FIG. 6.

This control character is designed to inherently improve the quickness in raising the air temperature in the vehicle compartment. Air temperature in the vehicle compartment does not rapidly reach set temperature "TS" even if heater core outlet temperature rises rapidly. Therefore, the air conditioner allows heater core outlet air temperature "TO" to rise, initially overshooting the value of "TS" to ensure that the air temperature in the vehicle compartment reaches set temperature "TS" rapidly.

Therefore, the automotive air conditioning system is adapted to improve a control response characteristic against influence from various disturbances. Further, the automotive air conditioning system may ensure improve control to provide stable control with a rapid response to reach a target temperature or to a modification of the set temperature inside of a passenger compartment, or both.

Although the present invention has been described in connection with preferred embodiments, the invention is not limited thereto. It will be understood by those skilled in the art that various modifications in form and detail may be made without departing from the spirit and scope of the invention.

I claim:

1. An air conditioning system for controlling the temperature of a passenger compartment in a vehicle, comprising:

a blower device directing an air flow toward said passenger compartment;

a heat exchanger for exchanging heat with said air flow generated by said blower device;

a pump driven by an engine for circulating an engine coolant therethrough;

a fluid passageway for passing said engine coolant therethrough serially connecting said engine, said pump and said heat exchanger;

a valve disposed in said fluid passageway for controlling said engine coolant flowing toward said heat exchanger;

a sensor device disposed adjacent to said heat exchanger means for sensing an air temperature of said air flow through said heat exchanger and generating an electrical sensor signal indicative thereof;

a temperature selector for selecting a target temperature of said air flow through said heat exchanger means and generating an electrical set signal indicative thereof;

a feed-forward control based on said electrical sensor signal and said electrical set signal, wherein said feed-forward control includes a feed-forward algorithm which calculates a first feed forward signal based on a deviation between said electrical sensor signal and said electrical set signal; and a control circuit for controlling an opening of said valve by integrating said feed-forward control and a feed-back control based on said electrical sensor signal and said electrical set signal.

2. The air conditioning system of claim 1, wherein said feed-back control includes a feed-back algorithm which calculates a feed-back signal based on a deviation between said electrical sensor signal and said electrical set signal.

3. The air conditioning system of claim 1, wherein said temperature selector includes a temperature selector operated by a passenger.

4. The air conditioning system of claim 1, wherein said sensor device includes a sensor disposed in said heat exchanger for sensing a fluid temperature of said engine coolant passed through said heat exchanger and providing an electrical sensor signal indicative of said fluid temperature of said engine coolant, and said feed-forward algorithm further calculates a second feed-forward signal based on said electrical sensor signal indicative of said fluid temperature of said engine coolant.

5. The air conditioning system of claim 1, wherein said feed-forward algorithm further calculates a third feed forward signal based on an electrical signal generated by a rotation speed of said engine.

6. The air conditioning system of claim 1, wherein said feed-forward algorithm further calculates a fourth feed-forward signal based on an electrical signal issued by voltage of said blower.

7. The air conditioning system of claim 1, wherein said sensor device further includes a sensor disposed in an inlet of said heat exchanger for sensing an air temperature of said air flow at said inlet of said heat exchanger and generating an electrical inlet air signal indicative thereof.

8. The air conditioning system of claim 1, wherein said feed-forward algorithm includes the following equation:

$$FF=(a \cdot N+b) \cdot X+c$$

in which $X=d \cdot (TS-TIN)/(TW-TIN)$ and FF is the opening of said valve expected, N is a rotation speed of said engine, TS is a set air temperature, TIN is an air temperature at an inlet of said heat exchanger, TW is a fluid temperature of said engine coolant at said inlet of said heat exchanger, and "a," "b," "c," and "d" are coefficients.

9. The air conditioning system of claim 8, wherein $$X=d \cdot (TS-TIN)/(TW-TIN)+e \cdot BLV+f,$$

in which BLV is a voltage of said blower, and "e" and "f" are coefficients.

10. The air conditioning system of claim 9, wherein N, TS, TW, and BLV are constants.

11. The air conditioning system of claim 1, wherein said feed-back control is a PI control.

12. The air conditioning system of claim 1, wherein said feed-back control is a PDI control.

13. The air conditioning system of claim 1, wherein said temperature selector includes a first sensor device for sensing air temperature in said passenger compartment, a second sensor device for sensing air temperature outside of said vehicle, and a third sensor device for sensing quantity of solar radiation.

14. The air conditioning system of claim 13, wherein said temperature selector is operated by calculating said target temperature based on an electrical signal generated by at least one of said first, second, and third sensor devices.

* * * * *